United States Patent [19]
O'Daniel

[11] Patent Number: 5,897,597
[45] Date of Patent: Apr. 27, 1999

[54] POSITIVE CRANKCASE VENTILATION SYSTEM DIAGNOSTIC

[75] Inventor: Gregory Francis O'Daniel, Davisburg, Mich.

[73] Assignee: General Motors Corporation, Detroit, Mich.

[21] Appl. No.: 08/740,178

[22] Filed: Oct. 28, 1996

[51] Int. Cl.$^6$ .................................................. G01M 15/00
[52] U.S. Cl. ............................ 701/29; 73/117.3; 123/679
[58] Field of Search .................................. 73/117.3, 116, 73/118.2, 115; 123/574, 679, 41.86, 689; 701/29

[56] References Cited

U.S. PATENT DOCUMENTS

| | | | |
|---|---|---|---|
| 3,630,076 | 12/1971 | Staudt ..................................... | 73/117.3 |
| 3,864,964 | 2/1975 | Voelz . | |
| 3,992,878 | 11/1976 | Moorman . | |
| 5,331,940 | 7/1994 | Takayama ............................... | 123/679 |
| 5,722,376 | 3/1998 | Sweeten .................................. | 123/574 |
| 5,792,949 | 8/1998 | Hewelt et al. .......................... | 73/117.3 |

OTHER PUBLICATIONS

U. S. application No. 08/705,895, Hewelt et al., filed Aug. 28 1996.

*Primary Examiner*—William A. Cuchlinski, Jr.
*Assistant Examiner*—Arthur Donnelly
*Attorney, Agent, or Firm*—Michael J. Bridges

[57] ABSTRACT

A diagnostic for diagnosing fault conditions including leak and restriction conditions in a positive crankcase ventilation (PCV) system of an internal combustion engine in which temperature of intake air passed to the PCV system and temperature of exhaust gas exhausted from the PCV system are monitored under test conditions and a temperature change across the PCV system generated therefrom for comparison to an expected temperature change reference as a function of current engine operating conditions. A significant persistent deviation of the temperature change away from the expected temperature change is indicated as a fault condition of the PCV system.

13 Claims, 2 Drawing Sheets

POSITIVE CRANKCASE VENTILATION SYSTEM DIAGNOSTIC

TECHNICAL FIELD

This invention relates to positive crankcase ventilation in internal combustion engines and, more particularly, to diagnosing fault conditions in a positive crankcase ventilation system.

BACKGROUND OF THE INVENTION

Internal combustion engine crankcase ventilation is generally understood to be required to remove combustion gases and unburned hydrocarbons, termed "blow-by gases," that leak by piston rings during combustion, leading to degradation in engine component materials and contamination of engine oil. Positive crankcase ventilation (PCV), purges blow-by gases from the engine crankcase, separates oil from the blow-by gases and returns the gases to an engine intake manifold to be consumed. PCV systems typically are relatively complex, including a purge control valve (PCV valve) and a plurality of flow lines with connections between the crankcase, the intake manifold, and a fresh air source. Flow restrictions in the PCV valve or in any of the flow lines, or leaks in the flow lines can interfere with effective purging of the blow-by gases, potentially leading to reduced engine performance and increased emissions. Currently, only when such restrictions or leaks are of an extreme character, for example as may cause perceptible degradation in engine performance, are they diagnosed and eventually treated. A performance or emissions penalty may be paid from the time the restriction of leak condition develops to the time of proper treatment thereof.

Copending U.S. patent application Ser. No. 08/705,895, filed Aug. 28, 1996, U.S. Pat. No. 5,792,949 assigned to the assignee of this application, discloses diagnosing a PCV system by monitoring PCV system pressure during a stable engine operating condition. Pressure excursions outside a pressure range are diagnosed as a leak or a restriction condition in the PCV system and are indicated. PCV system pressure monitoring requires exposure of pressure transducers to high contaminant levels and substantial temperature variation in the PCV system, which may reduce transducer life or increase transducer cost. Further, such prior art diagnostic may be engine crankcase volume (and therefore engine application) sensitive, leading to significant calibration effort to transport the diagnostic between engine applications.

Copending U.S. patent application Ser. No. 08/740,177, filed on the filing date of this application, attorney docket number H-197597, assigned to the assignee of this application, discloses diagnosing a PCV system by varying a restriction to flow through the PCV system and through synchronized sampling of engine intake mass airflow rate. If the sampled air rate changes in a manner significantly different than that expected for the controlled change in PCV system airflow restriction, a fault condition may be indicated. Such diagnostic requires an additional actuator which may be controlled in a manner intrusive upon other control operations and requires relatively complex synchronized parameter sampling to measure the impact of the varied PCV system flow on engine intake mass airflow rate. System cost and performance may be compromised under such approach.

Accordingly, it would be desirable to provide for low cost, simple, non-intrusive diagnosis of a PCV system which may easily be applied over a range of engine applications.

SUMMARY OF THE INVENTION

The present invention provides a desirable PCV system diagnostic that detects any significant restriction or leak condition in the PCV system that may negatively affect PCV system performance. Further, the diagnostic of this invention is non-intrusive and adds little to the cost of a PCV system.

More specifically, change in air temperature across a PCV system is monitored. The temperature change is compared to an expected change in temperature for the engine operating condition. If the temperature change deviates significantly from the expected temperature change, a fault condition may be present. For example, if the temperature change is significantly less than the expected temperature change, an air leak condition may be present that allows additional fresh air to be drawn into the PCV system or that allows PCV exhaust air to bypass temperature measurement, such as by passing to the atmosphere prior to temperature measurement thereof. Alternatively, if the temperature change is greater than the expected temperature change, a flow restriction condition may be present in the PCV system, reducing flow through the PCV system and increasing gas "residence time" within the PCV system, allowing for greater heat transfer to the gas passing through the PCV system.

In accord with one aspect of this invention, temperature of PCV intake and exhaust air is measured or estimated and a change in temperature across the PCV system derived therefrom. Engine operating conditions are monitored. An expected change in temperature from PCV intake to PCV exhaust is generated that corresponds to the monitored engine operating conditions. If the temperature change exceeds the expected change in temperature, an exhaust restriction fault condition may be present preventing free flow of air out of the PCV system, allowing for additional air heating time. If the conditions persists, a PCV restriction fault condition is indicated and details describing the condition are logged to facilitate treatment of the condition. If the temperature change is less than the expected change in temperature, a leak condition may be present in which additional intake air is being drawn into the PCV system or in which heated PCV exhaust gases are escaping the PCV system increasing PCV system airflow beyond that normally expected for the current engine operating conditions. If the condition persists, a PCV system fault condition is indicated and details describing the condition are logged to facilitate treatment of the condition.

In accord with yet a further aspect of this invention, a temperature transducer is disposed in the exhaust conduit of a PCV system for measurement of PCV exhaust gas temperature. An additional temperature transducer is disposed in position to measure PCV system intake air temperature. The additional transducer may already be present in the system for measuring engine intake air temperature in an engine intake air path or may be added in an engine air cleaner assembly or in a PCV system intake air conduit. A controller monitors engine operating conditions and when test conditions are met, samples and filters signals from the temperature transducers over a sampling period. Representative temperature values for PCV system intake and exhaust gas are determined from the samples and a difference valve representative of the change in gas temperature as it passes through the PCV system including an engine crankcase is calculated. An expected temperature difference is referenced from a controller memory device as a function of current engine operating conditions and is compared to the calculated difference. A significant deviation away from the expected temperature difference indicates a potential fault condition. A potential fault condition that persists over a plurality of test cycles indicates a fault condition. Rapid treatment of the fault condition is desired and is provided for through indication of the condition to the engine operator and through storing of information characterizing the fault condition to assist in timely repair or replacement of PCV system components, such as conduits, valves, seals, etc.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
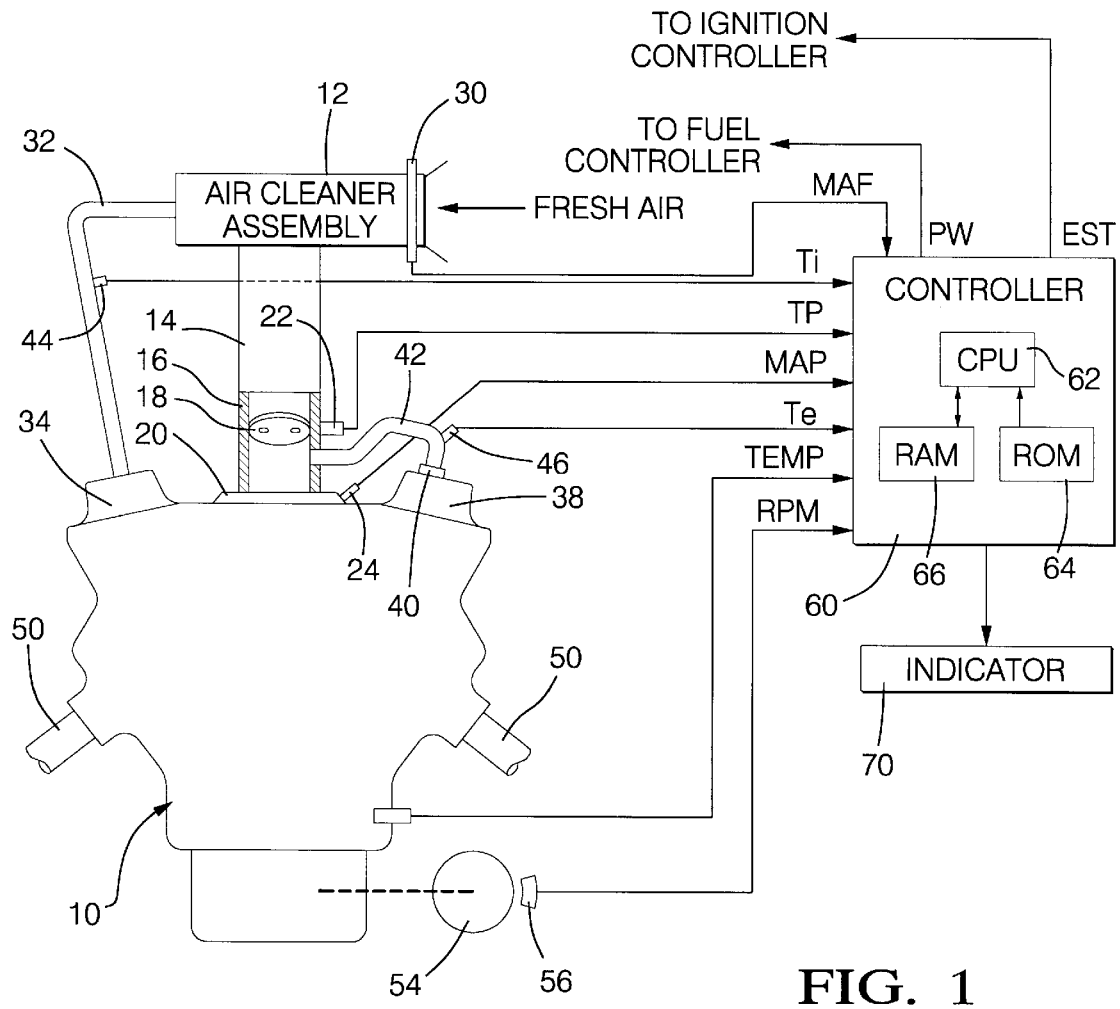
FIG. 1 is a schematic illustration of an installation of the diagnostic of this invention on a PCV system of an internal combustion engine.

Referring to FIG. 1, positive crankcase ventilation (PCV) system hardware installed on an internal combustion engine 10 including diagnostic hardware of a preferred embodiment of the present invention is shown. "Fresh" intake air is passed through an air cleaner assembly 12 including a conventional air filter (not shown) and a conventional mass airflow meter of the thick film or hot wire type. The airflow meter transduces mass of air passing thereacross into output signal MAF. The intake air passing through the air cleaner assembly is advanced through an intake air passage 14 and then to an intake bore 16 of the engine 10 in which a intake air valve 18 of the butterfly or rotary type is positioned and is rotated, such as under manual control by an engine operator, to vary a degree of restriction of the bore 18 to intake air passing therethrough and into engine intake manifold 20 for distribution to engine cylinders (not shown). The rotational position of the intake air valve 18 is transduced by transducer 22 of the rotary potentiometric type into output signal TP. Absolute air pressure in the intake manifold 20 is transduced by conventional pressure sensor 24 into output signal MAP. Engine coolant is circulated through an engine coolant circulation path (not shown) as is well-recognized in the art, with a temperature sensor, such as a thermocouple or thermistor disposed in the circulation path to transduce the temperature of the coolant into output signal TEMP. The intake air is combined with an injected fuel quantity and ignited in engine cylinders while the engine is "running", for reciprocating pistons within corresponding engine cylinders, the pistons rotationally driving an engine output shaft 54, such as a crankshaft. A plurality of circumferentially-aligned, spaced teeth or notches are disposed about the output shaft and pass in proximity to a sensor 56 fixedly mounted on the engine 10 and of the Hall effect or variable reluctance type, for transducing passage of the teeth or notches into periodic output signal RPM having a frequency proportional to engine output shaft rotational rate (hereinafter engine speed), and having individual signal cycles indicating tooth or notch passage events which correspond to engine cylinder events. Exhaust gas produced through the combustion of the air/fuel mixture in the engine cylinders is guided out of the cylinders through exhaust manifold 50 for catalytic treatment.

Combustion products and unburned hydrocarbons (hereinafter "blow-by gases") may pass by the pistons within engine cylinders the high pressure engine combustion process and enter the crankcase of the engine. Such blow-by gases are purged from the crankcase through the closed positive crankcase ventilation (PCV) system of this embodiment including the conventional elements of intake passage 32, outlet passage 42, valve 40 and interface seals. Intake passage 32 opens into the opening of air cleaner assembly 12 on a first passage end and into valve cover 34 on a second passage end opposing the first passage end. PCV valve 40 is secured in a hole through valve cover 38 preferably a significant distance from the point of delivery of fresh air into the crankcase from intake passage 32. PCV valve 40 is connected to intake manifold 20 through outlet passage 42 so that when the valve is open, intake manifold vacuum is applied to the crankcase through PCV valve for drawing bypass gases out of the crankcase, as is well-established in the art. Rubber seals (not shown) are securely engaged between the ends of intake passage 32 and the air cleaner assembly 12 and the valve cover 34, and between the ends of the outlet passage 42 and the PCV valve 40 and the intake manifold 20 to normally maintain a closed PCV system. A substantial pressure drop thereby exists across the PCV system from intake passage 32 to outlet passage 42, for drawing fresh air into the crankcase from within the air cleaner assembly 12 for mixing with bypass gases and for purging the resulting mixture from the crankcase, reducing oil and engine part contamination.

Conventional temperature transducer 46 in the form of a thermocouple or thermistor is installed in the outlet passage 42 preferably in close proximity to the PCV valve 40 for transducing outlet gas temperature into signal Te. Conventional temperature transducer 44 in the form of a thermocouple or thermistor is disposed in the inlet passage 32 preferably in close proximity to air cleaner assembly 12 to transduce PCV system intake air temperature into output signal Ti. The variation in gas temperature passing through the PCV system is, in this embodiment, indicated as a difference in temperature between that indicated by signals Ti and Te, providing information on PCV system operability.

The described signals including MAP, TP, RPM, TEMP, Te and Ti are provided as inputs to a controller 60 of the digital microcontroller type which includes such conventional elements as a central processing unit CPU 62, read only memory devices ROM 64 and random access memory devices RAM 66. The CPU 62 includes conventional elements of control circuitry (not shown) for controlling the timing and flow of controller operations and for controlling interaction between the controller elements and arithmetic logic circuitry (not shown) for executing required arithmetic, logic and comparison functions of the controller. The RAM devices include both the volatile type the contents of which may be erased when ignition power is removed from the controller 60, and the non-volatile type the contents of which survive removal of ignition power from the controller. The controller 60 is activated at the start of an ignition cycle by an engine operator, such as through manual application of ignition power to the controller to carry out a series of control, diagnostic and maintenance operations including operations to generate and issue fuel control command PW which is applied to a fuel controller for timed application to individual fuel injectors (not shown) and operations to generate ignition timing control command EST applied to an ignition controller for issuing timed spark plug drive commands for timed ignition of the air/fuel mixture in engine cylinders. Still further, the controller carries out PCV system diagnostics for diagnosing PCV system restriction or leak conditions and, in the event such a condition is diagnosed, for logging fault data in a memory device, such as a non-volatile RAM device 66 and for energizing an indicator 70, such as a lamp visible to the engine operator or an audible chime distinguishable by the engine operator.

Figure 2:
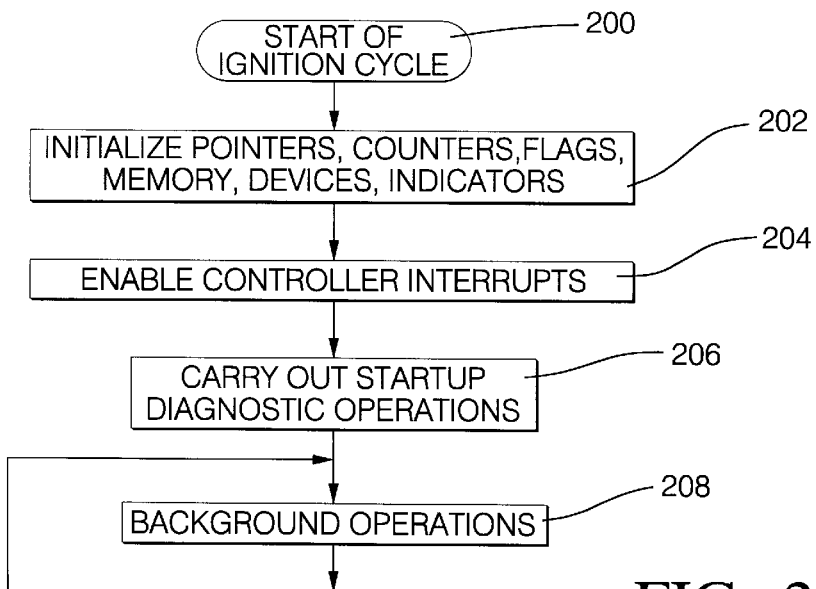
FIGS. 2, and 3 are flow diagrams illustrating a flow of operations for carrying out the diagnostic of this invention with the PCV system of FIG. 1.

More specifically, upon application of ignition power to the controller by an engine operator, the controller references a startup routine from a ROM device 64 including a series of controller instructions for initiating controller operations. Such operations are illustrated in a step by step manner in FIG. 2, starting at a step 200 and proceeding to initialize pointers, counters, flags, memory devices and indicators at a next step 202. Pointers, counters and flags are set to predetermined or previously calculated initial values at the step 202. Memory devices are cleared or receive startup values, such as through a transfer of instructions or data from ROM devices 64 to RAM devices 66 at the step 202. Indicators, such as lamps and chimes are initialized to appropriate starting states in accordance with the engine operating condition at the step 202. For example, the indicator 70 (FIG. 1) is energized at the step 202 if a PCV system fault condition has previously been diagnosed and is not yet treated, for example as indicated by the state of a corresponding fault flag stored in controller non-volatile RAM 66.

Following the initialization operations of the step 202, interrupts including time-based and event-based interrupts are enabled to occur following predetermined time periods or predetermined events, such as engine cylinder events at a next step 204. One such interrupt is a time-based interrupt enabled to occur about every one hundred milliseconds throughout an ignition cycle. Upon occurrence of any such interrupt, controller operations of a lesser priority are temporarily suspended and service operations corresponding to the interrupt that occurred are carried out to service the interrupt. Upon completion of such service operations, the suspended controller operations are resumed.

Following the enabling of interrupts, startup diagnostic operations are executed as represented by step 206 including any operations to diagnose controller operability such as standard self-test operations that are required conventionally. After the step 206, background operations are next carried out as represented by a step 208 which is continuously repeated. The background operations may include such well-known operations are controller maintenance and diagnostic operations of a relatively low priority and low priority control functions. Such background operations may, from time to time, be interrupted and temporarily suspended to allow for servicing of interrupts through execution of interrupt service routines, as described.

Figure 3:
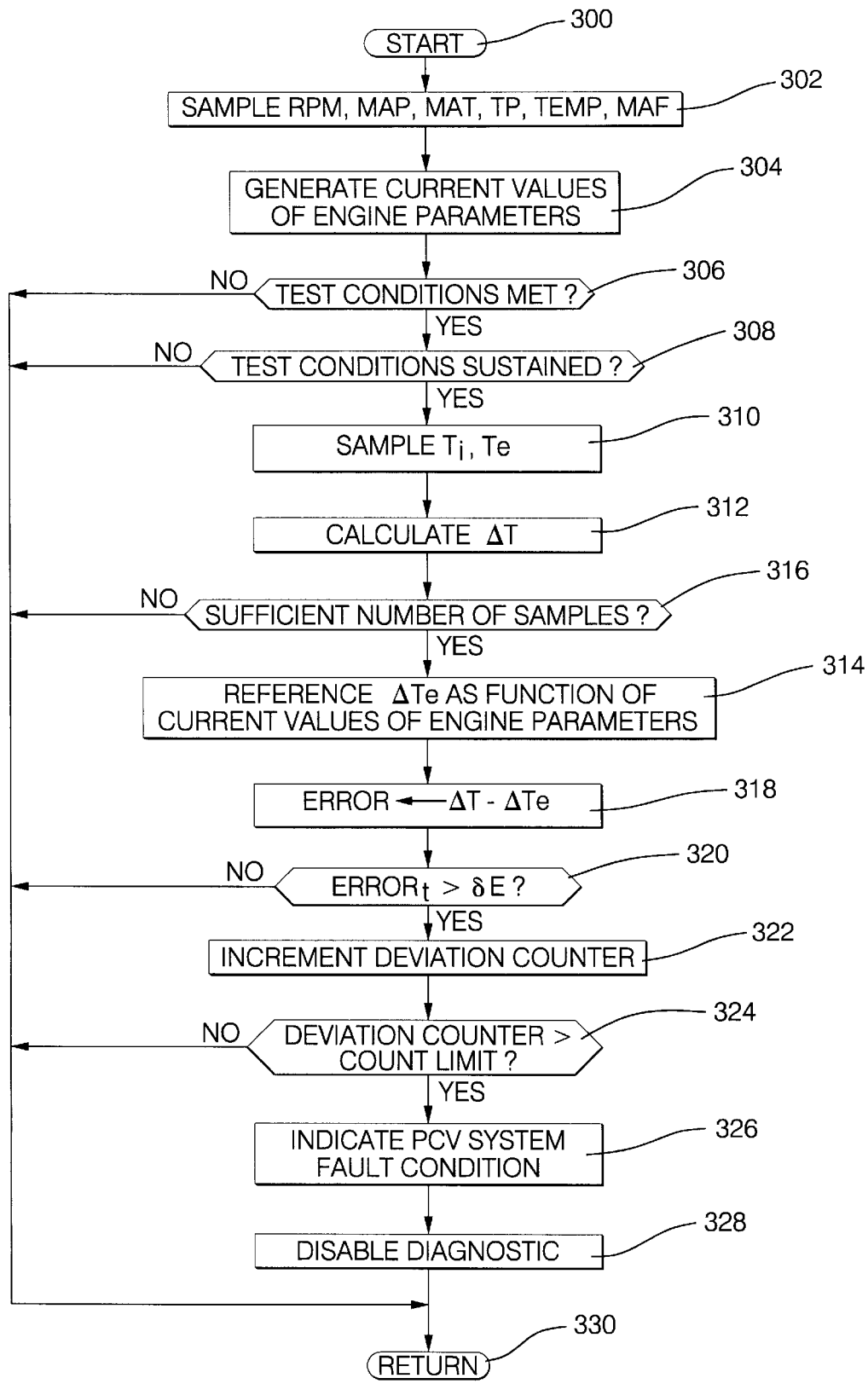

For example, upon occurrence of the described one hundred millisecond time-based interrupt that was enabled at the step 204, a stored service routine is executed including the instructions for carrying out the operations of FIG. 3 in a step by step manner, beginning at a step 300 and proceeding to a next step 302 at which the controller 60 provides for sampling of current values of signals RPM, MAP, MAT, TP, TEMP, and MAF. The sampled values are then applied along with prior samples of the input signals, such as through a conventional lag filter process, to determine current values of a plurality of engine operating parameters including engine speed, engine coolant temperature, and engine load at a next step 304.

A series of test conditions are next examined at a step 306. The test conditions include any entry conditions required to be present before execution of the diagnostic of this embodiment. Specifically, the engine coolant temperature must be above a calibrated threshold temperature, such as about ninety degrees Celsius, the engine speed must be at least 600 r.p.m. indicating a running engine, and engine load must be relatively steady to allow for accurate PCV system diagnosis in this embodiment. Other entry conditions may be required in accord with this invention, including conditions ensuring a predictable variation in the temperature of air flowing through the PCV system. If the test conditions are met, the diagnostic continues by proceeding to a next step 308 to determine whether the test conditions have not only been met for the current iteration of the routine of FIG. 3, but have been sustained over a plurality of such iterations. Under engine operating conditions characterized by sustained stable engine loads, sustained normal engine coolant operating temperatures and sustained engine speed above a speed threshold, accurate diagnosis of the PCV system through the operations of this embodiment is provided.

Accordingly, if the test conditions are determined to be sustained over a calibrated number of iterations of the routine of FIG. 3, PCV system temperature signals Ti and Te are sampled at next step 310. A difference value $\Delta T$ indicating a difference between Ti and Te is next calculated at a step 312, such as a simple difference between filtered Ti and Te signal values. The number of samples used to determine the difference value $\Delta T$ is next examined at a step 314. If the number of samples is greater than a calibrated threshold value, such as about five samples, as determined at the step 314, then it is assumed a representative temperature difference across the PCV system is provided by the value of $\Delta T$, and analysis of $\Delta T$ to diagnose the PCV system is carried out through execution of the next steps 316–328.

Specifically, an expected temperature difference is next referenced at a step 316 as a function of current values of engine operating parameters. A conventional calibration procedure is carried out to define, for a fault-free PCV system, the expected change in temperature from the intake passage 32 (FIG. 1) to the outlet passage 42 of the PCV system of FIG. 1 for a variety of engine operating conditions represented by engine parameter values. For example, under low engine speeds such as less than 1300 r.p.m. with relatively small intake air valve opening positions, such as less than ten percent of the valve opening range, a substantial temperature difference between Ti and Te is expected for a normally functioning system. Accordingly, $\Delta Te$ may be set to a large positive number for such operating conditions, such as at least ten degrees Celsius. Alternatively, for operating conditions characterized by a relatively large intake air valve opening position, a small increase in temperature is expected across the PCV system and the $\Delta Te$ value is then only slightly greater than zero. Other operating conditions characterized by ranges of engine operating parameters may readily be identified and expected change in temperature across the PCV system of FIG. 1 determined through a conventional calibration procedure through the exercise of ordinary skill in the art. The $\Delta Te$ values that result from this calibration procedure may then be stored in non-volatile memory devices, such as ROM devices 64 (FIG. 1) and indexed in memory using the corresponding engine operating parameter values.

Returning to FIG. 3, a current expected change in temperature value $\Delta Te$ is referenced from a memory device as a function of current engine operating conditions at the step 316 and a temperature error value ERRORt is next calculated as a difference between the expected temperature value $\Delta Te$ and the measured temperature change value $\Delta T$ at a next step 318. The magnitude of ERRORt is next compared to a calibrated error tolerance term $\delta E$ at a step 320, wherein the error tolerance term $\delta E$ is determined through a conventional calibration procedure as the degree of tolerable deviation between expected and actual temperature change across the PCV system of FIG. 1, for example to account for measurement and processing tolerances.

If the magnitude of ERRORt exceeds δE at the step 320, a deviation counter is incremented at a next step 322 and is compared to a count limit at a next step 324. The deviation counter indicates the persistence of any detected significant temperature deviation condition. Only persistent temperature deviation conditions away from an expected temperature change across the PCV system of FIG. 1 are indicated as fault conditions requiring conventional offline repair or replacement procedures. Temporary temperature deviation conditions may be attributed to measurement error or engine transient maneuvers of relatively short duration. Returning to step 320 of FIG. 3, if the magnitude of ERRORt does not exceed δE, the deviation counter is decremented at a step 330 and is limited to zero to avoid software overflow conditions. The counter is then compared to the count limit at the described step 324. A PCV fault condition is indicated at a step 326 if the deviation counter exceeds the limit at the step 324. The fault condition may be indicated by energizing the indicator 70 of FIG. 1, for example by illuminating a lamp visible to the engine operator or energizing a conventional chime. Additionally, at the step 326, fault codes may be stored in non-volatile RAM devices 66 (FIG. 1) indicating the PCV fault condition, and including information identifying the character of the fault condition. For example, the engine speed, intake air valve position, ΔT values, and any other information indicating the type of fault condition that is currently diagnosed may be stored in non-volatile memory at the step 326. After indicating the fault condition, the diagnostic is disabled, for example until the next engine ignition cycle at a step 328, for example by disabling the interrupt serviced through the operations of FIG. 3. Next, or if the test conditions are not met at the step 306, or if the test conditions were determined to not be sustained at the step 308, or if an insufficient number of samples were incorporated into the ΔT value as determined at the step 314, or if the deviation counter does not exceed the count limit at the step 324, the operations of the diagnostic of FIG. 3 are concluded by returning, via a next step 332, to any controller operations that were temporarily suspended to allow for servicing of the time-based interrupt that invoked the operations of FIG. 3, such as well-known engine control operations.

The preferred embodiment is not intended to limit or restrict the invention since many modifications may be made through the exercise of ordinary skill in the art without departing from the scope of the invention.

The embodiments of the invention in which a property or privilege is claimed are described as follows:

What is claimed is:

1. A diagnostic method for an internal combustion engine positive crankcase ventilation system having an intake air passage for admitting intake air to an engine crankcase and having an outlet gas passage for returning exhaust gas from the engine crankcase to an engine inlet air path, comprising the steps of:

sampling intake air temperature;

sampling exhaust gas temperature;

generating a temperature difference value as a function of a difference between the intake air temperature and the exhaust gas temperature;

comparing the temperature difference value to a stored expected temperature difference; and diagnosing a positive crankcase ventilation system fault condition when the temperature difference value deviates significantly from the stored expected temperature difference.

2. The method of claim 1, further comprising the steps of:

storing a schedule of expected temperature differences as a function of an engine operating parameter;

sampling at least one input signal indicating a current value of the engine parameter; and referencing an expected temperature difference from the stored schedule as the expected temperature difference corresponding to the current value of the engine parameter;

and wherein the comparing step compares the temperature difference value to the referenced expected temperature difference.

3. The method of claim 1, further comprising the steps of:

incrementing a fault counter when the temperature difference value deviates significantly from the expected temperature difference;

comparing the fault counter to a count threshold; and wherein the diagnosing step diagnoses a positive crankcase ventilation system fault condition when the fault counter exceeds the count threshold.

4. The method of claim 1, wherein the diagnosing step diagnoses a leak condition in the positive crankcase ventilation system when the temperature difference value is significantly less than the stored expected temperature difference.

5. The method of claim 1, wherein the diagnosing step diagnoses a flow restriction fault condition in the positive crankcase ventilation system when the temperature difference value is significantly greater than the stored expected temperature difference.

6. A method for diagnosing fault conditions in an internal combustion engine crankcase ventilation system in which intake air is passed through an inlet passage to an engine crankcase and is exhausted from the crankcase through an outlet passage, comprising the steps of:

sampling inlet air temperature in the inlet passage;

sampling outlet air temperature in the outlet passage;

determining a temperature change value indicating the change in temperature of air passing through the positive crankcase ventilation system as a function of the sampled inlet and outlet air temperature;

comparing the temperature change value to an expected temperature change value; and indicating a fault condition when the air temperature change value is significantly different than the expected air temperature change value.

7. The method of claim 6, further comprising the steps of:

sampling transducer output signals indicating a current engine operating condition; and referencing the expected air temperature change value as a function of the sampled transducer output signals.

8. The method of claim 6, wherein the indicating step further comprises the steps of:

indicating a leak condition in the positive crankcase ventilation system when the air temperature change value is significantly less than the expected air temperature change value; and indicating a flow restriction condition in the positive crankcase ventilation system when the air temperature change value is significantly greater than the expected air temperature change value.

9. The method of claim 6, further comprising the steps of:
determining a difference between the air temperature change value and the expected air temperature change value; and
comparing the determined difference to a difference threshold;
and wherein the indicating step indicates a fault condition when the determined difference exceeds the difference threshold.

10. The method of claim 6, further comprising the steps of:
incrementing a fault counter when the air temperature change value is significantly different than the expected air temperature change value; and
comparing the fault counter to a count limit;
and wherein the indicating step indicates a fault condition when the fault counter exceeds the count limit.

11. A diagnostic method for diagnosing fault conditions including leak and restriction conditions in a positive crankcase ventilation system including an inlet air passage for passing intake air from an engine intake air path to an engine crankcase and an outlet air passage for exhausting gases from the crankcase to an engine intake manifold, comprising the repeated steps of:
sensing crankcase intake air temperature;
sensing crankcase exhaust gas temperature;
calculating a temperature difference value representing a difference between the sensed crankcase intake air temperature and the sensed crankcase exhaust gas temperature;
comparing the temperature difference value to an expected temperature difference;
incrementing a fault counter when the temperature difference value is substantially different than the expected temperature difference;
comparing the fault counter to a count limit; and
indicating a positive crankcase ventilation system fault condition when the fault counter exceeds the count limit.

12. The method of claim 11, further comprising the step of decrementing the fault counter when the temperature difference value is not substantially different than the expected temperature difference.

13. The method of claim 11, further comprising the steps of:
storing a schedule of expected temperature differences as a function of varying values of an engine parameter;
sampling an input signal indicating a current value of the engine parameter; and
referencing, from the stored schedule, the expected temperature difference corresponding to the current value of the engine parameter;
and wherein the first recited comparing step compares the temperature difference value to the referenced expected temperature difference.

* * * * *